COMPLEX-VALUED SPATIAL FILTER USING PHASE MODULATION ONLY
Filed Jan. 19, 1970 2 Sheets-Sheet 1
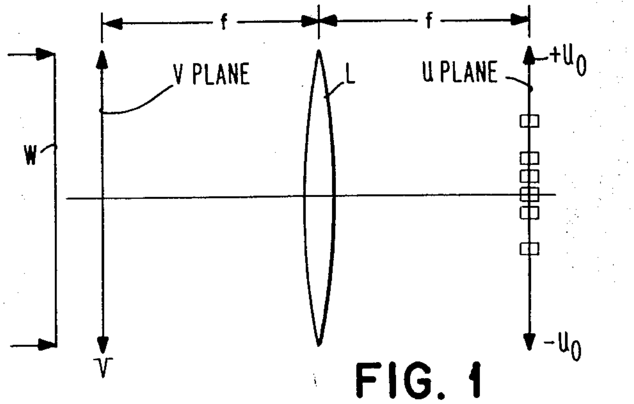
FIG. 1
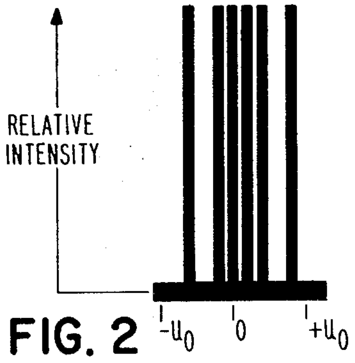
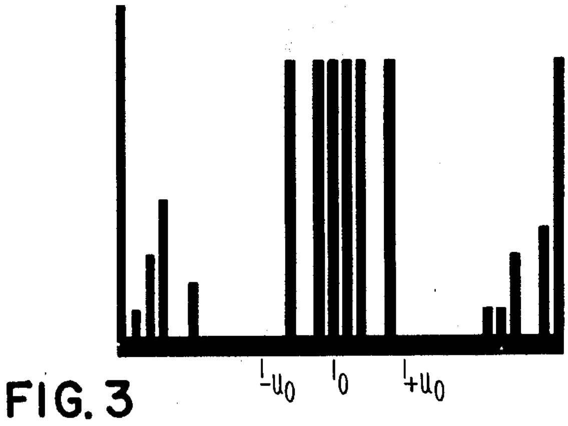
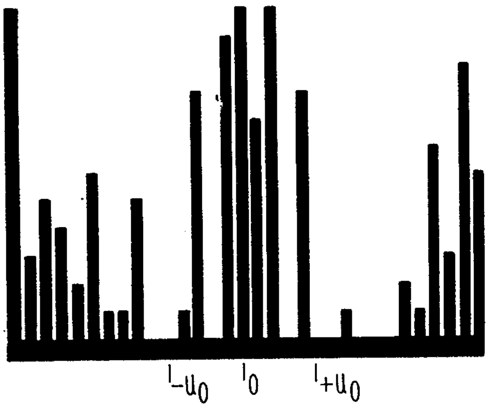
FIG. 4
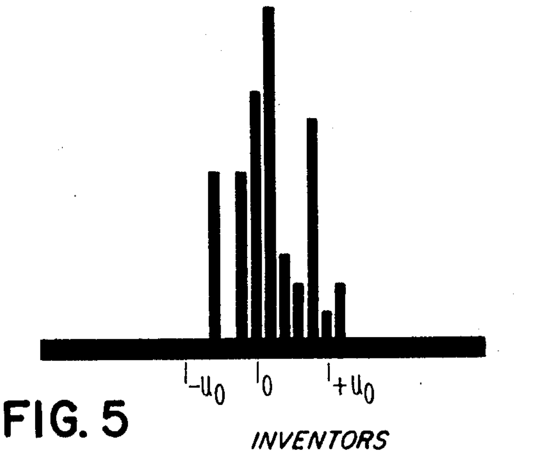
FIG. 5
INVENTORS
JOSEPH P. KIRK
ANDREW J. LAVIN
WILLIAM C. RODGERS
BY
ATTORNEY 3,606,542

COMPLEX-VALUED SPATIAL FILTER USING PHASE MODULATION ONLY

Joseph P. Kirk and Andrew J. Lavin, Endicott, and William C. Rodgers, Endwell, N.Y., assignors to International Business Machines Corporation, Armonk, N.Y.
Filed Jan. 19, 1970, Ser. No. 3,741
Int. Cl. G02b 5/18
U.S. Cl. 350—162SF 3 Claims

ABSTRACT OF THE DISCLOSURE

An improved optical spatial filter to produce a transform (image) representing phase and amplitude modulation of the incident wave. The filter is non-absorptive and achieves amplitude modulation of the desired image in a selected diffraction order by diffracting the unwanted light into non-selected orders. The filter is fabricated using only phase filter techniques. Other applications for the filter include conversion of a wave emanating from a given object into a wave representing a given image. Either a transmitted or reflected wave can be used to construct the image.

BACKGROUND OF THE INVENTION

Optical filters and holograms which modify only the phase of the incident wave have features which make them more desirable than conventional phase and amplitude filters. For example, phase type filters can handle larger amounts of energy because they are essentially non-absorptive. A particularly attractive feature of the relief type phase filter is the fact that it can be produced in virtually limitless quantities from a master using straightforward mechanical reproduction techniques. Thus, relief type phase filters are particularly desirable where large quantities must be produced.

Despite this substantial advantage of a phase type filter, the inherent limitations imposed by the inability to modulate amplitude render these filters unacceptable where high quality images are to be developed.

It would be desirable to provide a filter using only phase modulation techniques which nevertheless has the ability to provide an effective amplitude modulation characteristic to the incident wave.

SUMMARY OF THE INVENTION

The preferred embodiment of the invention is effective to modulate a phase and amplitude of an incident wave in a fashion to provide a desired image. The incident wave can be plane or spherical, or a wave emanating from a given object. The latter case is used in code conversion. Phase modulation may be achieved in a conventional fashion. A satisfactory method is that utilized in phase type holograms wherein the basic phase modulation is achieved by differences in emulsion thickness. Other methods of phase modulation such as changing the index of refraction could also be used. An amplitude modulation characteristic is achieved by utilizing a second component of phase modulation to diffract a quantity of light out of the selected diffraction order so that the remaining light is the desired amplitude component. The amount of light diffracted out of the selected diffraction order can be varied by altering the depth (amplitude) of the second phase modulation component. The frequency of the second component is such that the unwanted diffraction products fall outside the selected order. The orientation of the second component can be selected to reduce the frequency of the second component.

Since the phase component and the amplitude component in the desired image are the result of phase modulation, the filter can be produced using existing phase modulation techniques.

OBJECTS OF THE INVENTION

It is therefore an object of this invention to provide an improved spatial filter.

It is another object of this invention to provide an improved phase type spatial filter.

Still another object of this invention is to provide a spatial filter capable of imparting amplitude and phase modulation to an incident wave, but which utilizes only phase modulation techniques.

Still another object of this invention is to provide a phase type spatial filter capable of forming higher quality images than existing phase type filters.

A still further object of this invention is to provide an improved code conversion filter.

The foregoing and other objects, features, and advantages of the invention will be apparent from the following more particular description of preferred embodiments of the invention as illustrated in the accompanying drawings.

BRIEF DESCRIPTION OF THE DRAWINGS

FIG. 1 is a schematic drawing of the geometric optics utilized in a system according to this invention;

FIG. 2 is a plot of image intensity versus position in the plane for the desired image;

FIG. 3 is a plot of image intensity versus position in the plane for a square wave filter constructed according to the principles of this invention;

FIG. 4 is a plot of image intensity versus position in the plane for a sinusoidal filter constructed according to the principles of this invention;

FIG. 5 is a plot of image intensity versus position in the plane for a phase only filter according to the prior art;

THEORETICAL BACKGROUND

Figure 6:
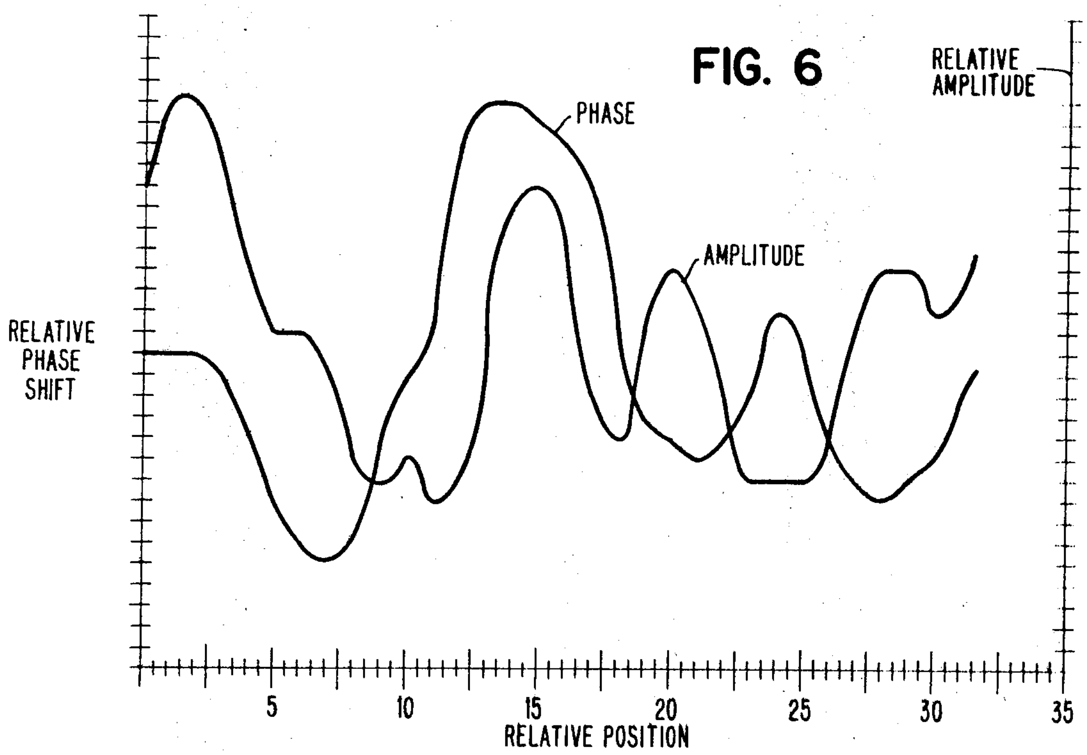
FIG. 6 is a plot of the amplitude and phase modulation which must be applied to an incident wave to provide the image of FIG. 2.

A complex-valued spatial filter modulates an incident wavefront so that the wavefront emergent from the filter is phase and amplitude modulated according to the desired function. In the example selected for the purpose of description, the incident wavefront is assumed to be a plane wavefront and all the modulation of the emergent reflected or transmitted wavefront to be the result of its encounter with the spatial filter. It is important to note that the incident wavefront need not be plane. In many applications of interest it would not be plane. However, the calculations are somewhat more complex in such situations.

While this is the special case of a Fourier transform filter and one-dimensional notation is employed for simplicity, it should be understood that the general methods to be described here are neither limited to Fourier systems nor to one-dimensional geometries.

In the case of images having a primary axis, the frequency of the phase modulation used to encode amplitude modulation of the wavefront can be reduced by diffracting the unwanted light above and below the image. In other words, the unwanted light is diffracted into orders lying along a line which is not parallel to the primary axis of the image.

It is desired to construct the function $f(u)$ for values of $u$ satisfying $-u_0<u<+u_0$ by using a spatial filter $F(v)$, where $F(v)$ is the Fourier transform of $f(u)$. In certain complex spatial filters previously developed, the filter $F(v)$ is given by:

$$F(v)=T[f(u)]=T[a(u)e^{i\Phi(u)}]=A(v)e^{i\phi(v)}$$

where T[Q] denotes the Fouries transform of Q. Conceptually, at least, such filters were synthesized by two component filters—one component to modulate the phase and one component to modulate the amplitude of incident waveforms.

In this invention, we propose that a function $$F'(v)=A_0e^{[i\phi(v)+\theta(v)]}$$

can be found such that $$T[F(v)]\simeq T[F'(v)]$$

in the region $$-u_0<u<+u_0$$

A filter producing the modulation $F'(v)$ would then be a complex-valued spatial filter modulating only the phase but in such a way that in the selected region the desired function, $f(u)$, is reconstructed. Therefore, the effect of the "amplitude" component of the phase modulation is to selectively diffract light into higher orders so that the component of the emergent wavefront reaching the region $-u_0<u<+u_0$ is $f(u)$. Putting it another way, the efficiency of the amplitude component of the phase modulation is varied in accordance with the desired amplitude modulation. In this sense, "efficiency" is taken to mean the ability of the filter to diffract light out of the image.

The full range of benefits inherent with phase modulation, such as ease of replication, linearity of photo material response, and registration, associated with manufacture of spatially dependent phase modulating structures can then be utilized in the construction of complex-valued spatial filters.

Consider the form of $\theta(v)$ where $$\theta(v)=h(v)P(u_pv) \quad (4)$$

where $P(u_pv)$ is a periodic function having a period $1/u_p$ and $|u_p|>|u_0|$.

Consider a region, $v_0\pm\epsilon$, of the spatial filter over which $A(v)$ varies only slightly from thevalue $A_v$. If within this region the amplitude $h_v$, of the phase modulation at frequency $u_p$, is controlled so that the light diffracted out of the zeroth order is just sufficient to make the amplitude of the component contributing to the zeroth order equal to $A_v$, then the phase modulation has achieved the desired amplitude modulation as far as light in the zeroth order is concerned. For the region $v_0\pm\epsilon$, $\theta=h_vP(u_pv)$ and outside this region $\theta$ will be zero. The amplitude of the diffracted light pattern in the image plane for this increment of the spatial filter is given by $$T\left[e^{ih_vP(u_pv)}\operatorname{rect}\left(\frac{V-V_0}{2\epsilon}\right)\right]$$

$$=2\epsilon\sum_{q=-\infty}^{\infty}Q_q(h_v)e^{\frac{-2\pi iV_0}{\lambda f}[u-qu_p\lambda f]}\operatorname{sinc}\left[\frac{2\epsilon}{\lambda f}(u-qu_p\lambda f)\right]$$

where:

$$\operatorname{rect}(x)=\begin{cases}1 & |x|<1/2\\ 0 & \text{otherwise}\end{cases}$$

$$\operatorname{sinc}(x)=\frac{\sin\pi x}{\pi x}$$

$\lambda$=wave length of the light
$f$=focal length of the transforming lens

The sinc functions above are characterized by a large amplitude principal lob and rapidly diminishing values elsewhere. The locations of the principal lobs in the distribution above correspond to the various diffraction orders. The value of the frequency parameter $u_p$ can be so chosen that the overlap between the orders is negligible. The amount of light diffracted into the $q$th order is then dependent upon the coefficient $Q_q(h_v)$ which in turn depends on $h_v$. For diffraction into the zero order the value of $h_v$ is so chosen that $A_v=Q_0[h_v]$. It should be recognized that some normalization of the amplitude distribution will probably be required. Now allow $hv$ to become a continuous function $h(v)$.

$$A(v)=Q_0[h(v)]$$

$$h(v)=Q_0^{-1}[A(v)] \quad (7)$$

Where $Q_0^{-1}[A(v)]$ denotes that argument $h(v)$ of $Q_0$ such that $Q_0[h(v)]=A(v)$ So that $$F'(v)=A_0e^{i[\phi(v)+Q_0^{-1}[A(v)]P(u_pv)]} \quad (8)$$

Under these conditions, Equation 3 will be satisfied. The approximation will approach an equality as the ratio $u_p/u_0$ becomes larger.

In the special case where the periodic function is a sine function, $P(u_pv)=\sin(2\pi u_p)$, $Q_0$ of Equation 6 becomes a Bessel function, $J_0(hv)$, and Equation 7 becomes $h(v)=J_0^{-1}[A(v)]$. So that the phase only recording of the complex-valued spatial filter $F'(v)$ becomes $$F'(v)=A_0e^{i[\phi(v)+J_0^{-1}[A(v)]\sin 2\pi u_pv]} \quad (9)$$

The composite phase modulation process can be simply described as one in which the high frequency modulation, $\theta(v)$, is used to control the amount of light that appears in the $-u_0<u<+u_0$ region from an incremental area of the filter. The light not appearing in the zeroth order is diffracted into higher orders.

Selection of the zeroth order for location of the desired image is arbitrary. The techniques of this invention allow the desired image to be placed in other orders as well. It is essential only that the amount of light placed into the selected order be variable as a function of the extent of phase modulation. Where other than the zeroth order is used, it may be desirable to characterize the phase modulation so that the image in the selected order is enhanced in accordance with standard techniques such as those used in blazed diffraction gratings.

For the purpose of explanation, a relatively simple image has been selected. This image represents six spots of light in the plane U of FIG. 1. The image is created as a consequence of phase modulation by phase filter V on the incident plane wave W. A lens L having a focal length $f$ serves to focus the filter output in plane U. It will be noticed that the image pattern is non-symmetrical about the optical axis, which is illustrated in FIG. 1 as a solid horizontal line.

FIG. 2 is a plot of intensity versus position for the desired image. The range of interest lies between $-u_0$ and $+u_0$ although the plot extends beyond this. It is within this region that photo detectors, display screen, emulsion or some other utilization device could be located. Certain simplifications exist in the system and image shown but these are for the purpose of illustration only. The image could be more complex but would require more computer time to generate the requisite phase filter. The desired image could be placed in a region other than the zeroth order but this would tend to complicate the description. Further, a two-dimensional image could be accommodated but this further complicates the description without adding to the understanding.

As a preview to the detailed discussion of the method by which the phase filter is developed, the plots of FIGS. 3–6 are shown. FIG. 3 is an intensity versus position plot for the preferred embodiment of the phase filter of the invention. Certain characteristics are immediately apparent. The zeroth order, which contains the desired image, is remarkably clear and well defined. All six spots are the same intensity and the blank spaces in the image are devoid of spurious responses which often characterize such filter generated images. The responses at the extremities of the plot in FIG. 3 represent some of the light which is diffracted into higher orders in order to develop amplitude modulation of the image in the zeroth order. Since this light lies beyond the area which is used, there are no adverse consequences. The filter used to develop the image of FIG. 3 is a square wave configuration. That is to say, the transitions between phase differences are as abrupt as can be fabricated.

An alternative embodiment of the filter utilizes a sine wave filter. The response of this filter is shown in FIG. 4. Instead of abrupt transitions between regions having different phase modulation characteristics, the transitions are smoothed to provide a sine wave configuration. In this embodiment, there is some degradation of the image quality. The signal to noise ratio is still very good and there would be no problem in utilization of this image.

The characteristics of a prior art phase only filter are shown in FIG. 5. The image of the phase only filter is substantially poorer than the sinusoidal filter of this invention. It is evident that the signal to noise ratio is so poor that there would be difficulty in utilizing the image.

FABRICATION OF THE FILTER

FIG. 6 is a graph of the phase and amplitude components of the filter used to produce the image as shown in FIG. 1 and FIG. 2. Since a one-dimensional image has been selected, the pattern shown in FIG. 6 is representative of the filter along a section taken parallel to the line passing through the six spots of the image. Only a portion of the filter is shown since the same pattern repeats across the entire surface.

The first step in fabrication is to evaluate the expression of Equation 9 for the selected image. This equation defines the composite phase modulation required to produce an image in the zeroth order. The exponent may be considered to contain two terms or components. The first term $\phi(v)$ is representative of the phase modulation. It is this term alone which produced the image of FIG. 5. The second term is $J_0^{-1}[A(v)] \sin(2\pi u_p v)$. While this is a phase modulation expression, it has the effect of diverting the unwanted light from the image in the selected diffraction order so that the remaining light represents the desired amplitude level.

Figure 8:
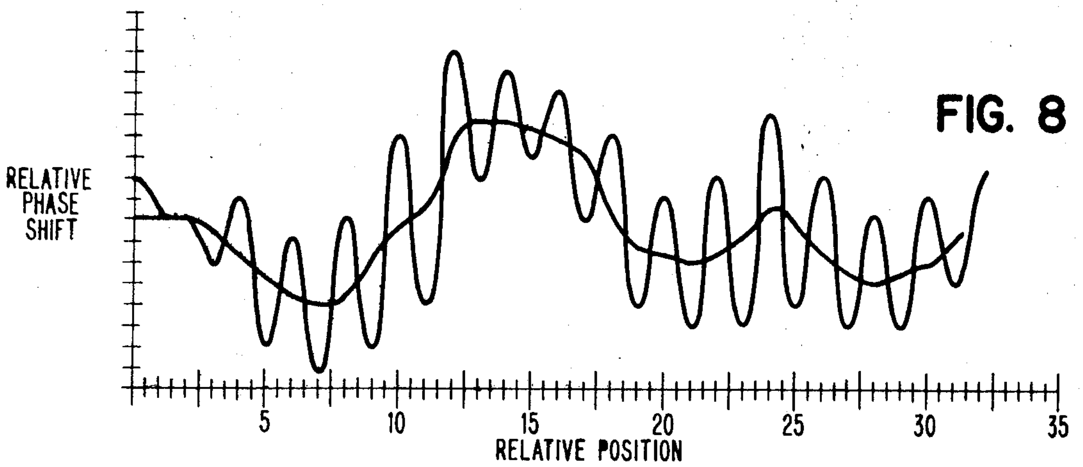
FIG. 8 is a plot of the phase modulation characteristics for a sinusodial filter constructed according to the principles of this invention.

These two phase modulation values have been combined into a single plot in FIG. 8. The shape of the plot still resembles the phase curve of FIG. 6, with the amplitude curve of FIG. 6 imposed as a high frequency component. The regions of low amplitude are indicated by a high depth of the high frequency phase modulation. For example, the amplitude peaks at position values 2, 15 and 24 are evident in FIG. 8 at the same points by a relatively shallow depth of modulation of the high frequency component at these points.

Figure 7:
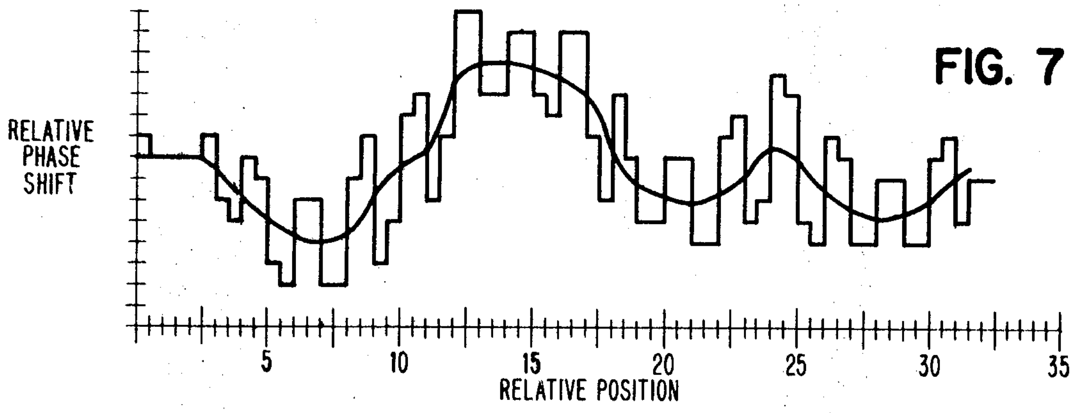
FIG. 7 is a plot of the phase modulation for a square wave filter constructed in accordance with the principles of this invention.

The square wave filter of FIG. 7 also corresponds to the plots of FIG. 6. In this case, the amplitude component appears in the high frequency square wave. The previously mentioned amplitude peaks at position values 2, 15 and 24 are evident at the corresponding points in FIG. 7 by the relatively shallow amplitude of the high frequency component. At these points there is less light diffracted out of the zeroth order because the depth of the high frequency component is less.

It is possible to translate the phase component of Equation 9 directly to a photosensitive medium through existing techniques such as those described in "Photographic Relief Images" and "Production of Photographic Relief Images with Arbitrary Profile" by Howard M. Smith, in the Journal of the Optical Society of America, vol. 58, No. 4, pages 533–539, April 1968, and vol. 59, No. 11, pages 1492–1494, November 1969, respectively. The same general techniques may also be applied to the amplitude component. The "efficiency" of the high frequency phase modulation may be determined experimentally by actual measurement of the undiffracted light for given depths of modulation. From this experimental data, the actual depth of phase modulation necessary to generate any amplitude characteristic can be determined. Other ways of modifying the efficiency may be used as well. While there are certain advantages in the use of a grating type phase modulation having a variable depth to amplitude modulate the wave in the selected order, other approaches may be used. For example, a pattern of dot-like depressions could be used. The dots would have a size such that they would diffract light beyond the zeroth order. The depth of the depressions would be related to the desired amplitude modulation.

The final filter can be fabricated on a computer driven plotter. The plotter output would be exposure distribution such that the desired net phase modulation due to the two components would be achieved in the final filter. In this fashion, a single filter can be made in one pass of the plotter, thereby avoiding the problems of registration which accompany the use of multiple filters.

Possible disadvantages of this "single plot" method are that the capabilities of the computer and plotter may be taxed in producing the desired resolution owing to the higher frequencies involved.

An attractive alternative exists which involves lower demands both on the plotter and the computer. This also uses the conventional process for achieving phase modulation. The photosensitive film is exposed so as to achieve $A_0 e^{i\phi(v)}$ modulation if the processing were to be carried to completion. The film is then overlaid with a mask that has a transmission of $T(v) = \sin 2\pi u_p v$ and a second exposure is made through this mask in such a way that a phase modulation of $h(v) = J_0^{-1}[A(v)]$ would have been achieved if the mask had not been interposed.

The processing is then completed so that the film becomes a phase modulator. This generally requires removal of unexposed silver by conventional development, fixing the image, and bleaching the resulting negative.

It should be noted that the overlay mask with a transmission of $T(v) = \sin 2\pi u_p v$, while analytically correct, is not physically realizable. A real mask would be of the form $$T(v) = 0.5 + 0.5 \sin 2\pi u_p v$$

so that the exposure through this mask would produce a "bias" modulation. This "bias" modulation would be compensated for in the first exposure so that the final exposure and processing result in the desired filter of Equation 9.

Once a single phase modulation filter has been constructed, copies of the filter can be made by mechanical means such as pressing. A metal master can be made from the film in accordance with techniques used to copy phonograph records. This master may then be used to press out copies of the original filter.

While the foregoing detailed description considers only the generation of an image from an incident plane wave, the same technique is also applicable to the code translation filter. Such filters are designed for the purpose of modifying more complex incident waves. The method of calculating the phase and amplitude characteristics is shown in a co-pending application of Adolph W. Lohmann, "Code Translation Filter," Ser. No. 587,507 filed Oct. 18, 1966, and now Pat. No. 3,497,288, issued Feb. 24, 1970 assigned to the assignee of this application.

While the invention has been particularly shown and decsribed with reference to preferred embodiments thereof, it will be understood by those skilled in the art that the foregoing and other changes in form and details may be made therein without departing from the spirit and scope of the invention.

What is claimed is:

1. A phase type complex spatial filter for modulating an incident light wave with desired phase and amplitude characteristics capable of producing an image having said characteristics in a given spatial region, said filter comprising:

a phase modulated integral medium modulated according to a resultant phase derived from first and second components, said first component having a first spatial frequency representing the desired phase characteristic, said second component having a higher second spatial frequency superimposed on said first spatial frequency, and representing the desired amplitude characteristic, said resultant phase providing said image with the desired phase and amplitude characteristics in which said first component contributes to the desired phase characteristics and said second component contributes to the diffraction of respective desired amounts of light into and away from said image, the former said amount of light corresponding to said amplitude characteristic.

2. A filter according to claim 1 wherein said medium is a photographic emulsion supported on a substrate and the emulsion surface is profiled in accordance with said resultant phase.

3. A phase type complex spatial filter for modulating an incident light wave with desired phase and amplitude characteristics capable of producing an image having said characteristics in a given spatial region, said image having a primary axis, said filter comprising:

a phase modulated integral medium modulated according to a resultant phase derived from first and second components, said first component having a first spatial frequency representing the desired phase characteristic, said second component having a different value second spatial frequency superimposed on said first spatial frequency, and representing the desired amplitude characteristic, said resultant phase providing said image with the desired phase and amplitude characteristics in which said first component contributes to the desired phase characteristics and said second component contributes to the diffraction of respective desired amounts of light into and away from said image, the former said amount of light corresponding to said amplitude characteristic and the latter said amount of light being diffracted on an axis which is not parallel to said primary axis.

References Cited

Lohmann et al., Applied Optics, vol. 6, No. 6, June 1967, pp. 1139–1140.

Lohmann, Applied Optics, vol. 7, No. 3, March 1968, pp. 561–563.

Lesem et al., IBM Jour of Research and Development, vol. 13, No. 2, March 1969, pp. 150–155.

DAVID SCHONBERG, Primary Examiner

R. J. STERN, Assistant Examiner

U.S. Cl. X.R.

350—3.5